United States Patent [19]

Grüne et al.

[11] 3,943,215
[45] Mar. 9, 1976

[54] METHOD FOR THE PRODUCTION OF A FOAM CUSHION WITH A COVERING

[75] Inventors: Horst Grüne, Leichlingen; Ulrich Knipp, Schildgen, both of Germany

[73] Assignee: Bayer Aktiengesellschaft, Leverkusen, Germany

[22] Filed: Oct. 4, 1973

[21] Appl. No.: 403,593

[30] Foreign Application Priority Data
Oct. 11, 1972  Germany............................ 2249652

[52] U.S. Cl. ................ 264/46.6; 264/46.8; 264/90; 264/257; 425/388; 425/817 R
[51] Int. Cl.² ........................................ B29D 27/04
[58] Field of Search ............. 264/45, 335, 54, 46.8, 264/46.6, 257, 90

[56]  References Cited
UNITED STATES PATENTS

| | | | |
|---|---|---|---|
| 2,240,581 | 5/1941 | Seward et al. ........................ 264/45 |
| 3,249,486 | 5/1966 | Voisinet et al. .................... 264/45 X |
| 3,258,511 | 6/1966 | McGregor............................ 264/45 |
| 3,327,029 | 6/1967 | Pincus et al. ........................ 264/45 |
| 3,349,153 | 10/1967 | Beck.............................. 264/335 X |
| 3,390,214 | 6/1968 | Woods.................................... 264/45 |
| 3,431,331 | 3/1969 | Pincus et al. ......................... 264/45 |
| 3,435,102 | 3/1969 | Sullhofer........................... 264/45 X |
| 3,505,436 | 4/1970 | Krug et al. ........................... 264/45 |
| 3,754,064 | 8/1973 | Snelling et al. .................. 264/335 X |

FOREIGN PATENTS OR APPLICATIONS 1,325,622  8/1973  United Kingdom............... 264/46.6

OTHER PUBLICATIONS

DeVries, Louis and Theo M. Herrmann, "German-- English Technical and Engineering Dictionary," Second Edition, Completely Revised and Enlarged, New York, McGraw-Hill, c1966, pp. 521 and 858.

Primary Examiner—Philip Anderson
Attorney, Agent, or Firm—Joseph C. Gil; Gene Harsh

[57]  ABSTRACT

A foam cushion with a covering of an elastic textile sheet structure is produced in a vacuum deep-draw mould by holding the sheet structure down during the suction cycle with a hold-down plate, but allowing it to slip through locally.

5 Claims, 4 Drawing Figures

METHOD FOR THE PRODUCTION OF A FOAM CUSHION WITH A COVERING

This invention relates to a method for the production of a foam cushion with a covering of an elastic textile sheet structure, in which the textile sheet structure is draped over a vacuum deep-draw mould, held down on the edge of the mould by pressure during the suction cycle and then underfoamed.

The textile sheet structure is backed by a sealing layer. This layer enables an effective vacuum to be applied and prevents the foamable reaction mixture from bleeding through the textile sheet structure. The textile covering generally consists of an elastic knitted fabric or of an elastic flock fabric.

In conventional processes, the elastic sheet structure to be deep drawn is held firmly on the edge of the mould by a hold-down plate. It is also known that claws or sharp pins can be additionally provided for arresting the sheet structure.

It is clear that the deep-draw properties of textile sheet structures of this kind are limited to relatively simple contours. In the case of seat cushions for vehicles of any kind, special contours adapted to the shape of the body are now a common requirement. It has never been possible with conventional methods to form textile sheet structures in such a way as to obtain these contours. Either the elasticity of the materials was inadequate or undesirable creases were formed during the deep-drawing process.

Accordingly, the object of the invention is to provide a method by which it is possible to produce cushions of this kind with complicated contours without producing undesirable creasing.

According to the invention, there is provided a method of producing a foam cushion with a covering of an elastic textile sheet structure, wherein the textile sheet structure is draped over a vacuum deep-draw mould, held down by pressure on the edge of the mould during the suction and then underfoamed, the textile sheet structure being initially held down and then allowed to slip by at least locally reducing the hold-down pressure.

In this way, the sheet structure is initially drawn onto the major surfaces of the mould interior and their raised zones, generally up to the elastic limit of the sheet structure. By reducing the hold-down pressure and at the same time maintaining the vacuum, the textile sheet structure is then given the opportunity to slip so that it is also applied to the remaining zones of the mould wall. In particular, the hold-down pressure can be reduced to different extents and for different periods at different zones so that the textile sheet structure is able to slip through to different extents. In this way, the deep-drawing process can be adapted to meet particular contour requirements. There is no danger of creasing because the textile sheet structure is stretched again as it slips. If necessary, the hold-down pressure can be increased and then reduced again in the meantime so that the deep-drawing process takes place in several stages. It is even possible by this method to produce seat cushions with transverse ribs which, in the past, have had to be produced by means of quilted seams. The slip-through rate must be such that that part of the textile sheet structure slipping through is stretched. The residual pressure remaining after the hold-down pressure has been reduced should preferably be empirically determined, depending upon the quality and smoothness of the mould edge, the sliding property of the textile sheet structure and the extent to which it is to be allowed to slip through. Tests with conventional textiles in the form of knitted fabrics and flock fabrics have indicated that the residual pressure required for the hold-down plate amounts for example to between 1.5 and 0.005 kg/cm linear load. The preferred pressure range is from 0.7 to 0.05 kg/cm linear load.

The apparatus for carrying out the method according to the invention comprises a vacuum deep-draw mould with a hold-down plate. The novel feature of this apparatus is that the hold-down plate is provided with means for allowing the textile sheet structure to slip, such as contact-pressure rollers or alternatively with compressed-air nozzles.

In cases where contact-pressure rollers are used, the countersurface facing towards the hold-down plate on the mould preferably comprises contact-pressure rollers as well.

In cases where compressed-air nozzles are used, the countersurface facing towards the hold-down plate on the mould is preferably provided with compressed-air nozzles as well.

Naturally, compressed-air nozzles and contact-pressure rollers can also be combined on the hold-down plate and/or the countersurface.

Parts of the apparatus according to the invention are illustrated purely diagrammatically in the accompanying drawings and described in detail in the following. In the accompanying drawings.

Figure 1:
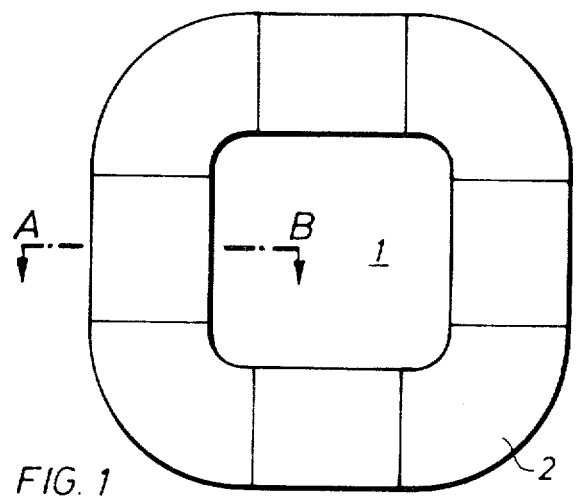
FIG. 1 is a plan view of the apparatus.

In FIG. 1, the apparatus consists of a mould 1 and a hold-down plate made up of individual segments 2.

Figures 2, 3, 4:
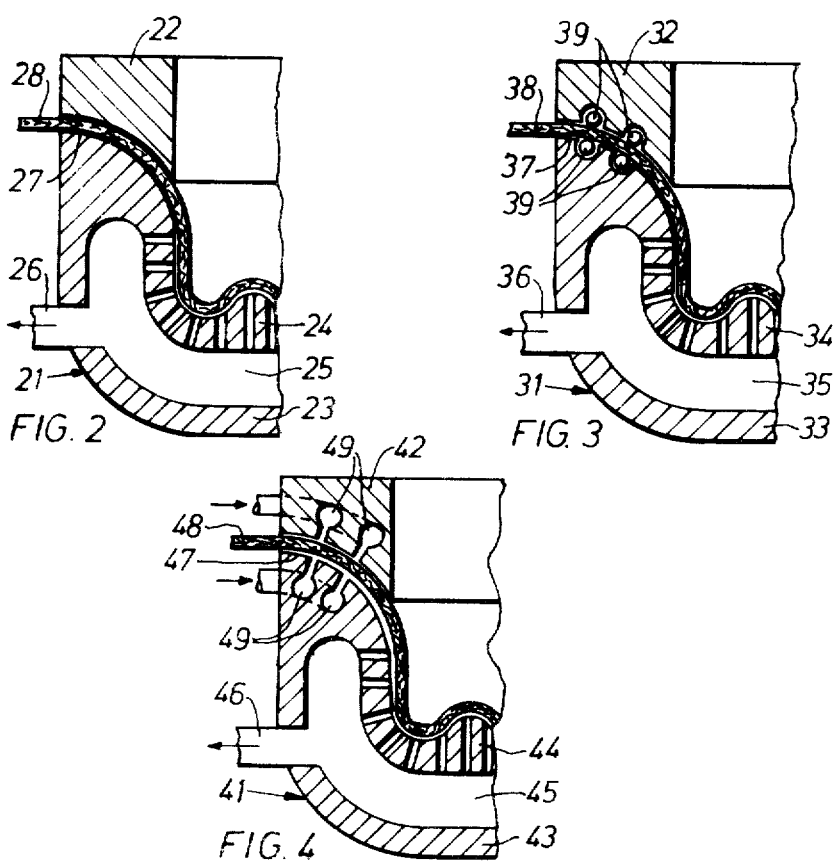
FIGS. 2 to 4 are sections on the line A-B in FIG. 1, each illustrating a different embodiment.

In FIG. 2, a mould 21 is made up of an impervious outer jacket 23 and a perforated inner jacket 24 contoured to match the contour of the cushion. Between the outer and inner jackets there is a vacuum zone 25 from which a connection 26 leads to a vacuum pump (not shown). A textile sheet structure 28 is clamped between the hold-down plate 22 and the edge 27 of the mould 21.

In FIG. 3, the mould 31 consists of an impervious outer jacket 33 and a perforated inner jacket 34, between which there is a vacuum zone 35 from which a connection 36 leads to a vacuum pump (not shown). The hold-down plate is provided with contact-pressure rollers 39. Identical contact-pressure rollers 39 are also arranged on the countersurface, i.e. on the edge 37 of the mould 31. A textile sheet structure 38 is clamped between the hold-down plate 32 and the edge 37 of the mould 31.

In FIG. 4, the mould 41 consists of an impervious outer jacket 43 and a perforated inner jacket 44. Between the outer and inner jackets there is a vacuum zone 45 from which a vacuum connection 46 leads to a vacuum pump (not shown). The hold-down plate 42 and the countersurface, i.e. the edge 47 of the mould 41, are provided with compressed-air nozzles 49. Through these compressed-air nozzles 49, compressed air is injected onto the textile sheet structure 48 clamped between the hold-down plate 42 and the edge 47.

What we claim is:

1. In a process for the production of a foam cushion with a covering of an elastic textile sheet structure by intimately conforming without permanent deformation said structure to the interior of a complexly contoured mold the improvement comprising
   a. draping the textile sheet structure backed by a sealing layer over the vacuum mold;
   b. holding the periphery of said sheet structure and sealing layer against the periphery of the mold cavity;
   c. applying a suction force through the mold to stretch said sheet structure and sealing layer so that they are drawn into the major surfaces of the mold interior until the elastic limit of the sheet structure and sealing layer is reached; and
   d. allowing the sheet structure and sealing layer to slip at portions of the mold cavity periphery while applying suction force so that the sheet structure fully conforms to the interior surface of the mold.

2. In the process of claim 1 the further improvement wherein the hold down pressure on the portion of the sheet structure allowed to slip is between 1.5 and 0.005 kg/cm of linear load during step (d).

3. In the process of claim 1 the further improvement wherein the hold down pressure on the portion of the sheet structure allowed to slip in step (d) is 0.7 to 0.05 kg/cm of linear load.

4. In the process of claim 1 the further improvement wherein in step (d) the hold down pressure is reduced to different extents and for different periods of time at different portions of the mold periphery such that different portions of the sheet structure are able to slip through to different extents thereby allowing the sheet structure to conform to particular mold contours without creasing.

5. In the process of claim 4 the further improvement wherein the hold down pressure is decreased, then increased and decreased again so that the conformation process takes place in several stages.

* * * * *